Figure 1:
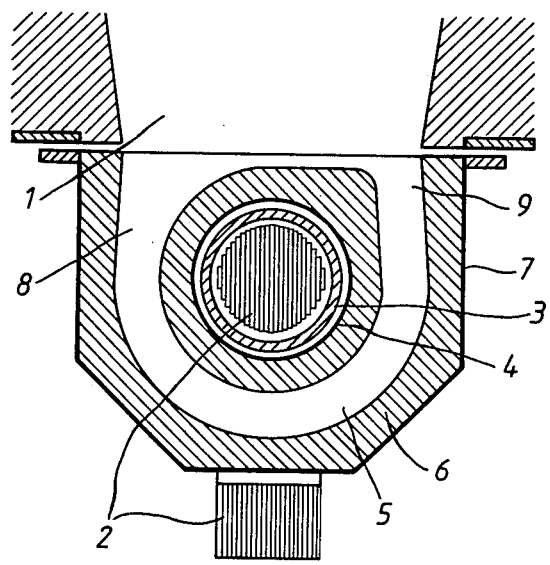

United States Patent [19]
Göte

[11] Patent Number: 4,458,353
[45] Date of Patent: Jul. 3, 1984

[54] CHANNEL-TYPE INDUCTION FURNACE
[75] Inventor: Tallbäck Göte, Västerås, Sweden
[73] Assignee: ASEA Aktiebolag, Västerås, Sweden
[21] Appl. No.: 435,044
[22] Filed: Oct. 18, 1982
[30] Foreign Application Priority Data
Oct. 20, 1981 [SE] Sweden ............................. 8106184
[51] Int. Cl.³ .............................................. H05B 5/00
[52] U.S. Cl. .................................................. 373/161
[58] Field of Search ................. 373/161, 159, 162, 163, 373/164, 160

[56] References Cited
U.S. PATENT DOCUMENTS
1,312,069 8/1919 Wyatt ............................. 373/161 X
FOREIGN PATENT DOCUMENTS
712636 1/1980 U.S.S.R. ............................. 373/161

Primary Examiner—Roy N. Envall, Jr.
Attorney, Agent, or Firm—Kenyon & Kenyon

[57] ABSTRACT

The invention relates to a channel type induction furnace having at least one inductor and closed channels, including side channels, interconnected at the bottom, possibly via a bottom channel joining said channels, and possibly also a central channel extending between the hearth and the bottom channel, especially designed for aluminum, copper or other non-ferrous metals or non-ferrous alloys. The channel type induction furnace according to the invention is characterized in that the height of the channel in a plane through the longitudinal axis of the primary coil is at least $4 \times \delta$, where $\delta$ is the depth of penetration into the melt of the current induced in the channel, and the width of the channel is at least $6 \times \delta$.

3 Claims, 5 Drawing Figures

CHANNEL-TYPE INDUCTION FURNACE

The present invention relates to a channel type induction furnace with at least one inductor and with closed channels, including side channels, interconnected at the bottom, possibly via a bottom channel, and possibly also a central channel extending between the hearth and the bottom channel, especially designed for aluminum, copper or other non-ferrous metals or non-ferrous alloys.

One problem in connection with such furnaces is the clogging of the channels which easily occurs, for example, when oxides of the metals to be heated/molten adhere to the channel walls. This means that cleaning of the channels must often be carried out, which is a dirty and often noisy work and which reduces the life of the inductors. In addition, the production capacity is reduced.

Attempts have been made to overcome the above-mentioned problem by introducing inert gas into the channels, but this renders the furnace more expensive and may also involve channel erosion.

Furnaces of channel type with open channels are known before, also with large channel dimensions, for example, of the Tagliaferri type. However, such furnaces involve certain disadvantages, such as limited powers and small hearths. Furnaces of this kind are defined in "Stöperitidende", 1957, No. 10.

One obstacle to channel type induction furnaces for greater powers, and not only aluminum, brass or copper furnaces, is the pinch effect which is caused by electromagnetic volume forces acting on the metal in the channel and tending to pinch or constrict the melt in the channels. An inductor cannot be run near the pinch effect (or power) limit since supplying transformers will then be overloaded. The pinch effect in brass furnace inductors—to mention one example—is temperature-dependent. In channel inductors for aluminum melting, the pinch effect may occur at too great a gas injection flow. It has been found that there exists a pinch effect limit, which has prevented the changeover to channel type induction furnaces for greater powers. (See further below in this connection)

The present invention aims to provide a solution to these problems and other problems associated therewith. The channel type induction furnace according to the invention is characterized in that the height of the channel in one plane through the longitudinal axis of the primary coil is at least $4 \times \delta$, where $\delta$ is the depth of penetration into the melt of the current induced in the channel, and the width of the channel is at least $6 \times \delta$. As mentioned above, closed channels are used. The cross-sectional shape and the length of the channel are of no significance, and the maximum cross-sectional dimensions are limited only by the available space and constructional possibilities.

The depth of penetration into the melt is obtained from the formula $$\delta = \sqrt{\frac{2 \times \rho}{2\pi \times f \times \mu_r \times \mu_0}} \quad (1)$$

where $\delta$ is the resistivity of the molten metal in ohm×m, $\delta$ is the depth of penetration into the metal, f is the frequency in Hz, $\mu_r$ is the permeability for molten metal (Al, Cu, brass)=1, and $\mu_0$ is the permeability in vacuum=$4\pi \times 10^{-7}$ H/m.

A channel type induction furnace according to the invention makes possible considerably greater sizes and considerably greater channel powers than what has been the case with previously known channel type furnaces. The channels are substantially free from clogging, i.e. there will be no mentionable adhesion of Al and Cu oxides on the channel walls. The furnaces may be of single or double channel type and suitably designed for melting aluminum, copper or brass.

Figure 2:
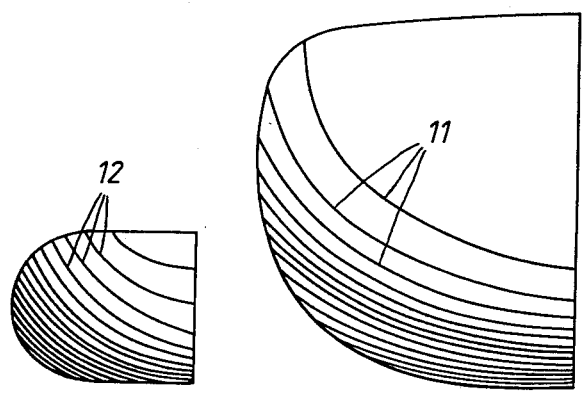
Figure 3:
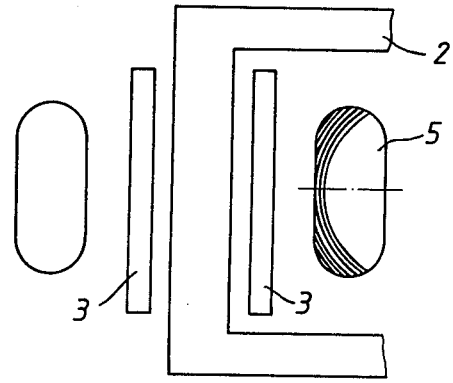
Figure 4:
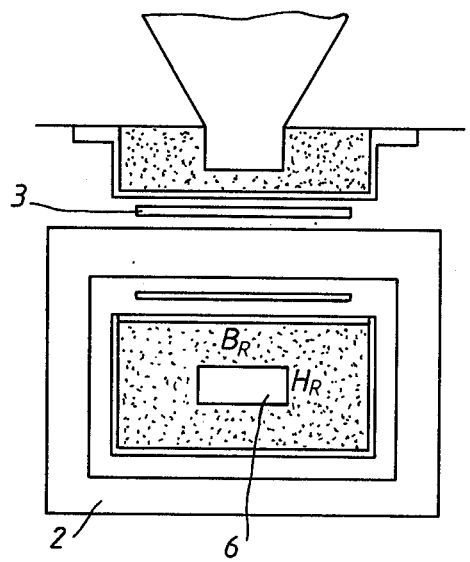
Figure 5:
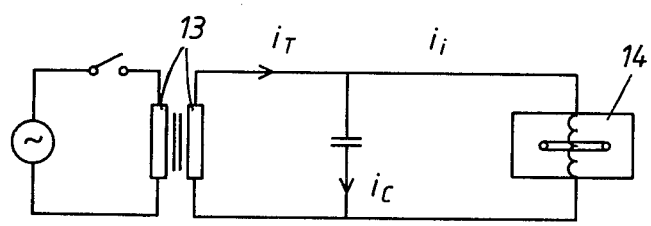
Figure 6:
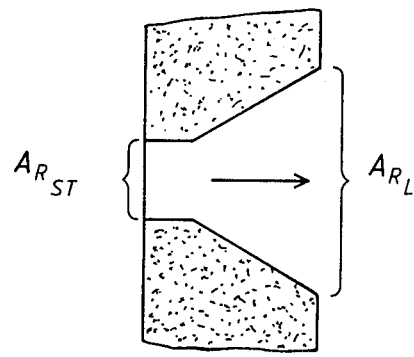

The furnace according to the invention will be exemplified in greater detail with reference to the accompanying drawings, in which FIG. 1 shows a cross-section through a single channel type furnace, showing a segment of the hearth and the inductor completely, FIG. 2 schematically shows power density curves in a channel, FIG. 3 is a detail of an inductor according to the invention, FIG. 4 is a cross-section of an inductor according to the invention and FIG. 5 shows power factor correction for a channel type induction furnace.

FIG. 1 shows a single channel inductor connected to a furnace hearth 1. The inductor consists of an iron core 2, a coil 3 with a cooling jacket 4, a closed channel 5 with a lining 6 and a shell or casing 7.

FIG. 4 shows a cross-section of an inductor in a plane through the longitudinal axis of the coil, and according to the invention the height $H_R$ of the channel 5 shall be at least $4 \times \delta$, where $\delta$ is the depth of penetration according to the above. The channel width $B_R$ shall be at least $6 \times \delta$.

For molten aluminum, for example, at 750° C., $\rho = 0.23 \times 10^{-6}$ ohm×m, and at f=50 Hz the following is obtained $$\delta = \sqrt{\frac{2 \times 0.23 \times 10^{-6}}{2\pi \times 50 \times 4\pi c\, 10^{-7}}} = 0.0341 \text{ m}$$

i.e. $H_R \geq 4 \times \delta \geq 0.136$ m
$B_R \geq 0.205$ m.

For copper, approximately the same values are obtained.

A channel with the dimensions $H_R \geq 4 \times \delta$, $B_R \geq 6 \times \delta$ may have a high power per unit of length of channel (dP/dl) in relation to the electromagnetic pressure $P_{em}$ in the channel.

The following approximate equations are valid:

$$\frac{dP}{dl} = \frac{\rho \times I_R^2}{\delta(B_R + 2 \times \delta)} \text{ (for wide channels)} \quad (2)$$

and $$P_{em} = \frac{\mu_0 \times I_R^2}{2 \times (B_R + 2 \times \delta)^2} \quad (3)$$

and $$\frac{dP/dl}{P_{em}} = \frac{2 \times \rho}{\mu_0}\left(\frac{B_R}{\delta} + 2\right) \quad (4)$$

$I_R$ is the current intensity of the channel.

A channel with characteristics according to the invention, which gives a high power per unit of length, dP/dl, can be used without pinching occurring.

A channel inductor is normally power factor corrected (see FIG. 5). During normal operation, $i_T < < i_i$ and $i_c \approx i_i$. $i_c$ is the current through a capacitance and $i_T$ is the secondary current of the transformer 13. $i_i$ is the current through a channel inductor 14.

When pinching occurs, $i_i \approx 0$, which leads to $i_T \approx i_c$. This results in a greater current than what is normal through the transformer 13, and its overload protection device can start to function and the power be switched off. This is a main reason why an inductor should not be operated near the pinch limit.

In addition, considerable mechanical stresses on the inductor lining occur in connection with pinching (compare with cavitation, which can hollow out steel in marine propellers). Moreover, the core and the coil are subjected to abnormal loading.

In addition to the above consequences of the pinch effect, overheating may take place.

In the case of pinching, the following equation is approximately valid: $P_{em} = C_1(P_0 + \rho_0 \times g \times h - P_{VAP})$, wherein $P_0$ is atmospheric pressure above the melt, $\rho_0$ is density of liquid metal, g is acceleration due to gravity=9.81 m/s², h is bath depth, $P_{VAP}$ is vaporization pressure of the melt, and $C_1$ is a non-dimensional constant of the order of magnitude one, depending on the geometry of the channel.

A channel according to the invention gives a low temperature difference between the channel and the vat. Generally, this temperature difference is inversely proportional to the channel area. When a large channel area is used, a low temperature difference is thus obtained between the channel and the hearth.

The high power per unit of length and the large channel area result in a non-clogging channel and the possibility of providing large channel type furnaces. A general rule is that increased metal velocity at the channel wall reduces the tendency to clogging. A high velocity is obtained with a high channel power.

Unsymmetrical channels in the channel type furnaces are known, per se, but in this invention the known concept can be combined with the inventive concept according to the invention. FIG. 1 shows an unsymmetric channel 6, in which one channel orifice 8 is larger than the other channel orifice 9. This channel is characterized in that a certain force strives to drive the melt out of the large orifice 8 and into the smaller one 9. Such a channel prevents the occurrence of flow stagnation points in the channel. This contributes to reduced temperature differences between the channel and the hearth, and to reduced clogging when operating with aluminum.

Curves with the same volume power, showing the volume power in a channel (equivolume power lines 11, 12), are shown in FIG. 2 for a large channel (right) and for a small, conventional channel (left). It will be seen that in the invention the power density is highest at the inside of the channel, towards the coil (see FIGS. 1 and 3, item 3). The channel resistance $R_{CH}$ depends on the distribution of the current density in the channel. (Volume power $P_v = \rho J^2$, where J is current density and $\rho$ is resistivity.)

With low voltage for the coil 3, the channel current $I_R$ is proportional to the voltage. At higher voltages, the channel current may become very unstable, fluctuating between practically zero and high values. This instability phenomenon is caused by the so-called pinch effect. The electromagnetic volume force acts on the molten metal in the channel and tends to pinch or constrict its cross-section. From practical pinching tests with double channel inductors for aluminum, the pinch effect (or power) limit increases with increasing bath depth. If the bath depth is increased from 1 m to 2 m, however, the pinch effect limit will not increase by 100%, but the increase will be of the order of 10-20%.

In brass furnace inductors, the pinch effect is temperature-dependent (vaporization of zinc produces pinching). The pinch effect may also occur in channels for aluminum furnaces with inert gas injection if the gas flow is too high. Against the background of these facts regarding pinching, it is reasonable to explain the pinching as a cavitation phenomenon.

The static pressure $P_{STAT}$ in the channel without channel current is obtained from:

$$P_{STAT} = P_0 + \rho_0 \times g \times h \tag{5}$$

wherein $P_0$ is the atmospheric pressure, $\rho_0$ is the metal density, h is the bath height, and g is the acceleration due to gravity.

With current through the channel, electromagnetic forces are obtained which set the melt in motion. The metal flow velocity v, in relation to the electromagnetic pressure $P_{em}$, will be as follows:

$$P_{em} = C_1 \times \rho_0 \times v^2/2 \tag{6}$$

where $C_1$ is a constant which is dependent on the channel geometry. The status pressure $P_{STAT}$ will then be lowered and we will obtain $$P_{STAT} = P_0 + \rho_0 \times g \times h - \rho_0 \times v^2/2 \tag{7}$$

When the metal velocity is so great that the static pressure approaches the vaporization pressure $P_{VAP}$ of the liquid, cavitation starts to appear.

Thus, according to this theory the condition for pinching is as follows:

$$\rho_0 \frac{v_{pinch}^2}{2} = P_0 + \rho_0 \times g \times h - P_{VAP} \tag{8}$$

or, with equations (6) and (7), we will obtain $$P_{empinch} = C_1(P_0 + \rho_0 \times g \times h - P_{VAP}) \tag{9}$$

The electromagnetic pressure $P_{em}$ is dependent on the channel power per unit of length (dP/dl) according to the relation $$(dP/dl) = C_2 \times P_{em} \tag{10}$$

where $C_2$ is a constant which is dependent on the channel geometry and the distribution of the electromagnetic field in the channel. With the equations (9) and (10) we will obtain $$(dP/dl)_{pinch} = C_1 C_2(P_0 + \rho_0 \times g \times h - P_{VAP}) \tag{11}$$

The electromagnetic theory shows that the coefficient $C_2$ increases with increasing channel dimensions. If $H_R > 2\delta$ and $B_R > 2\delta$, the following is approximately valid:

$$\left(\frac{dP}{dl}\right)_{pinch} = \quad (12)$$

$$C_1 \frac{2\rho}{\mu_0} \left(\frac{B_R}{\delta} + 2\right) (P_0 + \rho_0 \times g \times h - P_{VAP})$$

Thus, this theory shows that the pinch effect limit may be increased with increasing channel dimensions. Because the channel is non-clogging, there is no risk of pinching as a result of clogging. Thus, according to the invention, it is possible to provide furnaces with large capacity without the hitherto known difficulties arising. In the longitudinal section, the channel may be rounded or consist of two side channels with a bottom channel, joining said side channels, possibly with a central channel extending from the hearth to the bottom channel. The channel dimensions relate to the smallest area.

I claim:

1. Channel type induction furnace having at least one closed-channel inductor, comprising side channels joined together at their bottoms, which furnace is especially designed for aluminum, copper or other non-ferrous metals or non-ferrous alloys, the smallest height of the channel in a plane through the longitudinal axis of the primary coil being at least $4 \times \delta$, where $\delta$ is the depth of penetration into the melt of the current induced in the channel, and the smallest width of the channel being at least $6 \times \delta$, so as to avoid substantial influence on the melt flow in the channel, caused by the pinch effect.

2. Channel type induction furnace according to claim 4 in which the difference side channels have mutually different cross-sectional areas.

3. Channel type induction furnace according to claim 2 in which one side channel has a larger orifice area towards the hearth than the other side channel, the differences in areas creating a force which tends to drive a melt in the channel out of the larger channel orifice and into the smaller channel orifice when the inductor is in connection with a hearth containing a melt.

* * * * *

UNITED STATES PATENT AND TRADEMARK OFFICE
CERTIFICATE OF CORRECTION

PATENT NO. : 4,458,353

DATED : July 3, 1984

INVENTOR(S) : Tallback Gote (should be Gote Tallback)

It is certified that error appears in the above-identified patent and that said Letters Patent is hereby corrected as shown below:

On the title page, Item [75] Inventor:

Change the name of the inventor to Gote Tallback

Signed and Sealed this

Nineteenth Day of February 1985

[SEAL]

Attest:

DONALD J. QUIGG

*Attesting Officer*     *Acting Commissioner of Patents and Trademarks*